US010498836B2

(12) United States Patent
Devarajan et al.

(10) Patent No.: US 10,498,836 B2
(45) Date of Patent: Dec. 3, 2019

(54) NETWORK BASED SERVICE DISCOVERY VIA UNICAST MESSAGES

(71) Applicant: Hewlett Packard Enterprise Development LP, Houston, TX (US)

(72) Inventors: Venkatavaradhan Devarajan, Bangalore (IN); Vijay Kannan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 207 days.

(21) Appl. No.: 15/566,947

(22) PCT Filed: Jun. 18, 2015

(86) PCT No.: PCT/US2015/036340
§ 371 (c)(1),
(2) Date: Oct. 16, 2017

(87) PCT Pub. No.: WO2016/175872
PCT Pub. Date: Nov. 3, 2016

(65) Prior Publication Data
US 2018/0131775 A1 May 10, 2018

(30) Foreign Application Priority Data
Apr. 29, 2015 (IN) .......................... 2189/CHE/2015

(51) Int. Cl.
*H04L 29/08* (2006.01)
*H04L 12/46* (2006.01)
*H04L 29/12* (2006.01)

(52) U.S. Cl.
CPC ............ *H04L 67/16* (2013.01); *H04L 12/462* (2013.01); *H04L 12/4633* (2013.01);
(Continued)

(58) Field of Classification Search
CPC ......... H04L 29/08648; H04L 29/12113; H04L 2012/5621; H04L 67/16; H04L 12/462;
(Continued)

(56) References Cited

U.S. PATENT DOCUMENTS

2007/0206596 A1 9/2007 Ishikawa et al.
2007/0250590 A1* 10/2007 Flannery ................. H04L 12/66
709/217
(Continued)

FOREIGN PATENT DOCUMENTS

CN 103647853 A 3/2014

OTHER PUBLICATIONS

UPnP Forum, "UPnP™ Device Architecture 1.1", Oct. 15, 2008, 136 pages.
(Continued)

*Primary Examiner* — Nam T Tran
*Assistant Examiner* — Lam H Duong

(57) ABSTRACT

In one example, a system is described which includes an underlay network including a mapping server and a mapping database, an overlay network including VTEPs, at least one peripheral device, and at least one client device connected to the at least one peripheral device via the VTEPs. Further, each VTEP includes a traffic optimization module. A first VTEP receives a first service advertisement from a first peripheral device offering the first service and registers service advertisement information with the mapping database, a second VTEP connected to a first client device queries the mapping database to discover the first peripheral device via a unicast message, retrieves the service advertisement information from the mapping database upon a successful query, and sends the retrieved service advertisement information to the first client device, and the first client
(Continued)

device selects the first peripheral device offering the first service using the service advertisement information.

15 Claims, 5 Drawing Sheets

(52) U.S. Cl.
CPC .......... *H04L 12/4641* (2013.01); *H04L 61/25* (2013.01); *H04L 2012/4629* (2013.01)

(58) Field of Classification Search
CPC . H04L 12/4641; H04L 12/4633; H04L 61/25; H04L 2012/4629; H04L 12/4695; H04L 61/2592
USPC .......................................................... 709/203
See application file for complete search history.

(56) References Cited

U.S. PATENT DOCUMENTS

| | | | |
|---|---|---|---|
| 2008/0304408 A1* | 12/2008 | Kraemer | H04L 12/2803 370/230 |
| 2013/0100851 A1* | 4/2013 | Bacthu | H04L 12/18 370/254 |
| 2013/0170490 A1 | 7/2013 | Kreeger et al. | |
| 2014/0012967 A1* | 1/2014 | Agarwal | H04L 61/1511 709/223 |
| 2014/0071990 A1 | 3/2014 | Banavalikar et al. | |
| 2014/0269555 A1 | 9/2014 | Sadasivam et al. | |
| 2014/0269705 A1 | 9/2014 | DeCusatis et al. | |
| 2014/0355450 A1 | 12/2014 | Bhikkaji et al. | |
| 2014/0369345 A1 | 12/2014 | Yang et al. | |
| 2015/0016300 A1 | 1/2015 | Devireddy et al. | |
| 2015/0055651 A1 | 2/2015 | Shen et al. | |
| 2015/0063353 A1 | 3/2015 | Kapadia et al. | |
| 2016/0285641 A1* | 9/2016 | He | H04L 12/185 |
| 2016/0315781 A1* | 10/2016 | Dronadula | H04L 12/1886 |
| 2017/0302475 A1* | 10/2017 | Chan | H04L 45/00 |

OTHER PUBLICATIONS

Mahalingam et al., "VXLAN: A Framework for Overlaying Virtualized Layer 2 Networks over Layer 3 Networks", Internet Engineering Task Force, Internet Draft, Apr. 2014, 23 pages.

International Preliminary Report on Patentability received for PCT Patent Application No. PCT/US2015/036340, dated Sep. 11, 2017, 7 pages.

Gross et al., "Geneve: Generic Network Virtualization Encapsulation", Network Working Group, Internet-Draft, Intended status: Standards Track, Oct. 25, 2014, 24 pages.

Garg et al., "NVGRE: Network Virtualization Using Generic Routing Encapsulation", Independent Submission, Request for Comments: 7637, Sep. 2015, 17 pages.

Farinacci et al., "The Locator/ID Separation Protocol (LISP)", Internet Engineering Task Force (IETF), Request for Comments: 6830, Jan. 2013, 75 pages.

Cheshire et al., "Multicast DNS", Internet Engineering Task Force (IETF), Request for Comments: 6762, Feb. 2013, 70 pages.

"Configuring clients to use Wide-Area Bonjour", available online at <http://www.dns-sd.org/clientsetup.html>, retrieved on Oct. 11, 2018, 3 pages.

International Searching Authority, The International Search Report and the Written Opinion, dated Mar. 2, 2016, PCT/US2015/036340, 10 Pgs.

Pepelnjak, Ivan, "VXLAN, IP Multicast, OpenFlow and Control Planes" Dec. 15, 2011, 4 Pgs.

\* cited by examiner

NETWORK BASED SERVICE DISCOVERY VIA UNICAST MESSAGES

BACKGROUND

Entities from organizations to individuals have implemented computer networks of varying sizes and levels of security. Computer networks have allowed entities to connect digital devices and to allow digital devices to share images, files, video, streaming content and other data with one another. Computer networks may have transitioned from using platform-specific protocols toward using general network addressing protocols, such as Transmission Control Protocol/Internet Protocol (TCP/IP). Under general network addressing protocols, devices may be assigned unique network addresses used to identify their locations on the network. The location may be used to identity the device as a source or destination of network traffic, and can be appended to a portion of traffic to and from the device. In various systems, the unique network address of a device is either statically or dynamically assigned to the device.

Devices coupled to a network including general protocols may communicate to one another by broadcasting messages to other devices on a network, multicasting messages to multiple devices on the network, or unicasting messages to a single device on the network. In such a virtualized network, the extended IP subnet is referred to as a virtual network (VN) or an overlay network and is a single Layer-2 broadcast domain. Further, the Layer-3 (L3) fabric in the extended IP subnet is referred to as an underlay network. Example L3 fabric includes data centre and/or wide area networks. Furthermore, in the extended IP subnet, the virtual extensible local area network (VXLAN) tunnel end points are referred to as VTEPs. Generally, when VTEPs receive multicast message from their client devices or service providers (e.g., peripheral devices such as printer, Apple TV, storage devices and other devices that offer network based services) on the overlay network, the VTEPs may flood the multicast messages out to other VTEPs in the VN. When volume of traffic on the overlay network increases, it may result in significantly increased load on the underlay network that transports the multicast traffic across the L3 fabric and/or place an additional load on source VTEPs to replicate and send the multicast messages to other VTEPs.

BRIEF DESCRIPTION OF THE DRAWINGS

Examples of the disclosure will now be described in detail with reference to the accompanying drawings, in which.

DETAILED DESCRIPTION

In the following detailed description of the examples of the present subject matter, references are made to the accompanying drawings that form a part hereof, and in which are shown by way of illustration specific examples in which the present subject matter may be practiced. These examples are described in sufficient detail to practice the present subject matter, and it is to be understood that other examples may be utilized and that changes may be made without departing from the scope of the present subject matter. The following detailed description is, therefore, not to be taken is a limiting sense.

Examples, described herein provide methods, techniques, and systems for optimization of traffic utilization on the underlay network for network based service discovery in a virtualized network deployment. For example, zero-touch service deployment applications, such as multicast domain name system (MDNS) and simple service discovery protocol (SSDP), may use multicast transport to advertise and discover network based services in the local area network (LAN) and as the number of clients and services in the VN increases, network utilization on the underlay network can significantly increase and/or may result in considerable increased load on VTEPs to replicate each multicast frame and send it out as unicast to each other VTEP.

Figure 1:
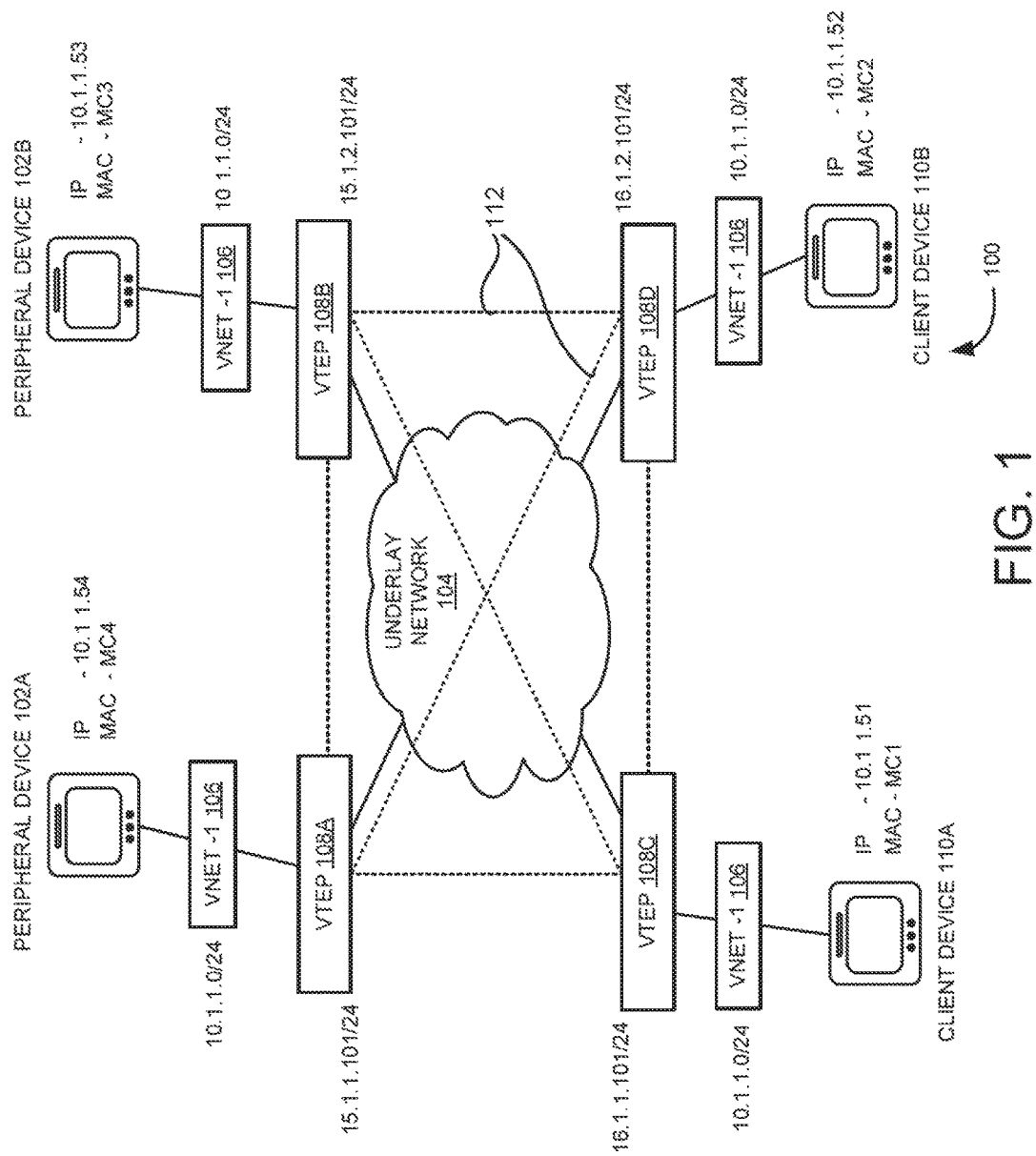
FIG. 1 illustrates a block diagram of an example system for underlay network traffic utilization for service discovery in virtualized network deployments.

FIG. 1 shows multitenant network topology 100 including VTEPs 108A-D and a mesh of tunnels 112. Example multitenant network topology can be a multitenant data center network topology. As shown in FIG. 1, multitenant network topology 100 includes underlay network 104 (e.g., L3-fabric) and overlay network (e.g., VNET subnet 106 with network IP 10.1.1.0/24). VXLAN uses VTEPs to map end devices to VXLAN segments and to perform VXLAN encapsulation and de-encapsulation. Each VTEP function can have two interfaces, one being a switch interface on the local LAN segment to support local endpoint communication through bridging, and the other being an IP interface (e.g., tunnels 112) to the transport IP network. As shown in FIG. 1, tunnels 112 are represented as dashed lines interconnecting VTEPs 108A-B.

Further as shown in FIG. 1, multitenant network topology 100 includes peripheral devices 102A-B for providing network based services. Example peripheral devices providing network based services include printer, Apple TV, storage devices and the like. Also as shown in FIG. 1, multitenant network topology 100 includes client devices 110A-B that make use of the network based services provided by peripheral devices 102A-B. Example client devices include mobile phones, laptops and the like. In the example shown in FIG. 1, multitenant network topology 100 is described using two peripheral devices 102A-B and two client devices 110A-B, however, any number of peripheral devices and client devices can be connected in multitenant network topology 100.

Peripheral devices 102A-B, that provide network based discovery services via MDNS and/or SSDP, periodically advertise their capabilities using a subnet local IP multicast address. All client devices that are in the subnet receive such advertisements. Further, when a client device come up or request a service, the client device can also query for availability of the service via a subnet local multicast query. All peripheral devices in the LAN can see the subnet local multicast query and the ones that offer the service will respond back to the client device. The client device (i.e., a user) can choose from a multiple of devices that offer the service and subsequently communicate with the peripheral device via a unicast message.

When an IP subnet extends across the underlay network, multicast traffic may have to constantly traverse the underlay network and can cause the underlay network utilization to increase considerably when the number of peripheral devices offering services and the number of client devices in the overlay network increases as each VTEP may have to flood traffic to all the other VTEPs via the underlay network. Further, in some examples where the underlay network may not provide substantial support for multicast traffic, for instance in some data centers and wide area deployments, source VTEPs may have to replicate each multicast frame and send out as unicast frame to every other VTEP and this replication may place considerable load on the VTEP forwarding engine when the multicast traffic volume in the overly network increases and/or when there are significantly higher number of VTEPs in the overlay network. Also, when a peripheral device offering the service and a client device are co-located on the same VTEP, it may be wasteful on network bandwidth to have client device of a VTEP pick a service that is across the VXLAN tunnel.

Various examples described below may provide a mapping database (e.g., registry) in the underlay network that is accessible by all VTEPs in the VN domain. When a VTEP receives a multicast service advertisement (e.g., such as MDNS protocol frames) from a peripheral device, the VTEP registers the service advertisement information with the mapping database instead of flooding/forwarding to all other VTEPs. Example service advertisement information include a service type, IP address (e.g., IP version 6 (IPv6) of the service provider (e.g., peripheral devices), and IP address of the VTEP associated with the service. Upon connecting a client device to a VTEP in the VN domain, client device sends a request looking for a service and the VTEP that receives the request sends a query attempting to discover the service in the mapping database to determine if there are registered peripheral devices that provides the requested service by the client device. If the query is successful, then VTEP retrieves the service advertisement information from the mapping database and proxy responds to the requesting client device on behalf of the peripheral device offering the service.

In case when there are multiple peripheral devices providing the requested service, one proxy response corresponding to each peripheral device is sent such that the client device can choose the desired peripheral device from the available peripheral devices. Such communication between the client devices, peripheral devices and the mapping database results in unicast messages being sent between the VTEP and the mapping database, thereby optimizing multicast traffic transportation across the underlay network while still retaining the zero touch service deployment capability of MDNS.

The terms "underlay network" and "physical network" are used interchangeably throughout the document. Also, the terms "overlay network" and "virtualized network" are used interchangeably throughout the document. Further, the terms "unicast message", "unicast traffic" and "unicast frame" are used interchangeably throughout the document. Furthermore, the terms "multicast traffic", "multicast frame" and "multicast message" are used interchangeably throughout the document, The term peripheral device refers to input devices (e.g., a keyboard, a mouse, a graphic tablet, a touch screen, an image scanner, a microphone, a webcam, and a barcode reader), output devices (e.g., a display device, a printer, and a graphical output device), storage devices (e.g., an external hard drive, a flash drive/solid-stare drive, a disk drive commonly within a hard drive enclosure, a Smartphone or tablet computer storage interface, a CD-ROM drive, and a DVD-ROM drive) and input and output devices (e.g., a modem and a network interface controller). Further, the term client device can include a laptop, mobile device, desktop, and the like.

Figure 2:
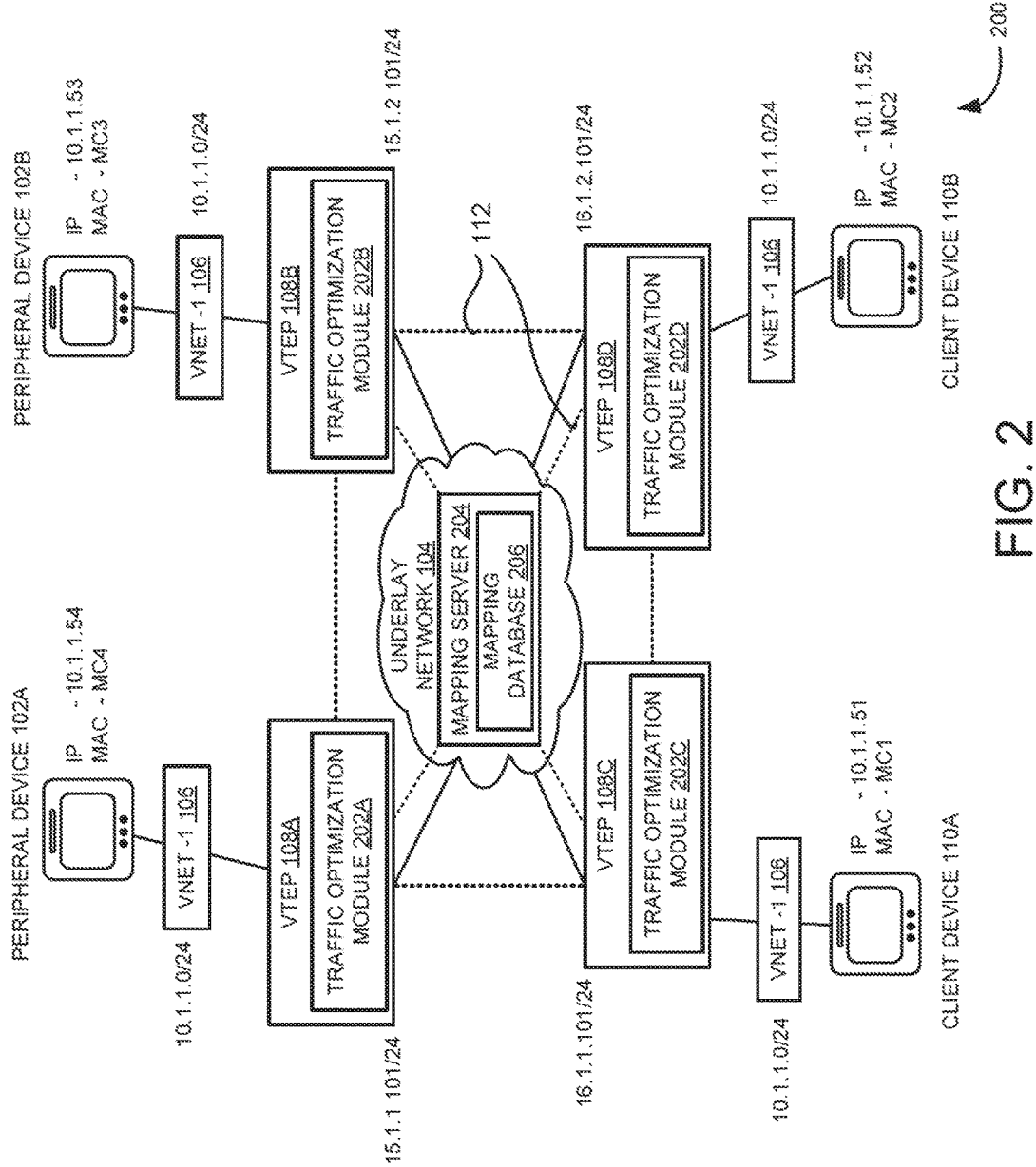
FIG. 2 illustrates a block diagram of an example system for underlay network traffic optimization for service discovery in virtualized network deployments.

FIG. 2 illustrates a block diagram of an example system 200 for optimization of traffic utilization on the underlay for service discovery in virtualized network deployment. The system 200 may represent any type of computing system capable of reading machine-executable instructions. Further, system 200 includes underlay network 104 and an overlay network (e.g., VNET 106) virtually connected to underlay network 104. The overlay network includes VTEPs 108A-D to transport traffic for the overlay network. For example, the overlay network is a single layer-2 extended IP subnet, and the underlay network is an L3 fabric. Furthermore, system 200 includes peripheral devices 102A-B and client devices 110A-B communicatively connected to peripheral devices 102A-B via VTEPs 108A-D in the subnet network (VNET 106). In the example shown in FIG. 2, peripheral devices 102A and 102B are connected to VTEPs 108A and 108B respectively and client devices 110A and 110B are connected to VTEPs 108C and 108D respectively.

Further as shown in FIG. 2, underlay network 104 includes mapping server 204 and mapping database 206 residing in mapping server 204. For example, the mapping database includes a Locator/Identifier Separation Protocol (LISP) registry, domain name system (DNS) registry and/or a proprietary registry. LISP is an Internet Engineering Task Force (IETF) Request for Comments (RFC) based protocol that can be used to register different type of mappings and it can be enhanced to support MDNS/Universal Plug and Play (UPnP) mappings. Further by extending LISP, the same registry can be used for support seamless client mobility in the network and thereby serve as a common registry for multiple purposes within the network domain. DNS registry is a standard DNS lookup service that can be modified to hold MDNS mappings. Each VTEP may register its local mappings with this DNS server and query for it when there is a client request for a service. In proprietary registry, a VTEP can be programmed to register all service advertisements with a proprietary registry system earlier and the interfaces between the VTEPs and the registry can be via a proprietary protocol.

Further, each of VTEPs 108A-D includes a traffic optimization module 202A-D. In operation, when a peripheral device (e.g., peripheral device 102A) broadcasts a service advertisement (e.g., MDNS/SSDP protocol frames) indicating availability of a service in the subnet, VTEP 108A associated with peripheral device 102A offering the service receives the service advertisement and registers the service advertisement information with mapping database 206.

In one example, traffic optimization module 202A residing in VTEP 108A receives the service advertisement from peripheral device 102A offering the service and registers the service advertisement information associated with the service advertisement with mapping database 206. In some examples, traffic optimization module 202A translates the service advertisement into identifiable service advertisement information, and registers the identifiable service advertisement information with mapping database 206 residing in underlay network 104. In some examples, each VTEP caches information about the services local to the VTEP on its system in addition to registering the services. Mapping database 206 is connected to the L3 fabric and can be used as a repository for storing all network service information associated with VTEPs. For example, the service advertisement information includes at least one of a service type, Internet protocol (IP) address of service provider (i.e., peripheral device 102A), and IP address of VTEP 108A. Example mapping database with sample entries is shown in below table 1:

TABLE 1

| Service Type | Service Station Address | Associated VTEP |
| --- | --- | --- |
| Printer | 10.1.1.45 | 16.1.1.101 |
| Apple TV | 10.1.1.37 | 16.1.2.101 |
| Printer | 10.1.1.56 | 15.1.1.101 |

Further, a client device (e.g., client device 110B) sends a request for discovering a service. Furthermore, traffic optimization module 202D residing in VTEP 108D connected to client device 110B receives the request and queries mapping database 206 to discover the availability of peripheral device offering the service via a unicast message upon receiving the request.

In one example, traffic optimization module 202D receives the request and determines whether peripheral device 102A offering the service is locally available in a cache associated with VTEP 108D. If peripheral device 102A offering the service is locally available in a cache associated with VTEP 108D, then VTEP 108D ignores the request as peripheral device 102A (i.e., service provider) can directly respond to client device 110B's request, thereby ensuring that the services local to a VTEP would serve up the client devices that are connected to the same VTEP to keep traffic local to the VTEP. In other words, if the client device and the peripheral device offering the requested service are on the same VTEP, then the client device and the peripheral device can be paired up thereby considerably reducing underlay bandwidth usage.

In the example shown in FIG. 2, peripheral device 102A is not available locally to VTEP 108D. Since peripheral device 102A offering the service is not available in the cache associated with VTEP 108D, traffic optimization module 202D residing in VTEP 108D queries mapping database 206 to determine whether there is any other VTEP that has registered the requested service (i.e., peripheral device 102A offering the requested service).

Further, traffic optimization module 202D retrieves the service advertisement information associated with peripheral device 102A from mapping database 206 upon a successful query (i.e., when peripheral device 102A offering the requested service is available) and sends the retrieved service advertisement information to client device 110B. In one example, traffic optimization module 202D proxy sends the retrieved service advertisement information to client device 110B using a proxy and adds the service advertisement information to a cache associated with VTEP 108D.

In some examples, if there are multiple peripheral devices that offer the requested service, one proxy-response can be sent corresponding to each peripheral device (e.g., service-provider-IP) such that client device 110B can select one of the peripheral devices for using the service. Client device 110B selects peripheral device 102A offering the requested service using the service advertisement information via a unicast message. Further, client device 110B sends the unicast message to peripheral device 102A offering the requested service upon selecting peripheral device 102A, and second traffic optimization module 202D bridges peripheral device 102A and client device 110B via the VTEPs 108A and 108D using tunnels 112. For example, when a client device sends out a unicast traffic destined to a service provider IP, a VTEP connected to the client device can bridge the unicast frame across the tunnel to a VTEP that houses the service provider, thereby sending the unicasts across the underlay network and for the service usage instead of sending the multicast advertisements.

In some examples, the mapping database can be queried for availability of a peripheral device for providing network based discovery service by a VTEP connected to a client device based on locality based policies, for instance, to prevent clients from reaching out to services outside of its local VTEP. For example, policies can be set to decide whether a local client device can make use of local services or the ones across the L3 fabric.

Figure 3:
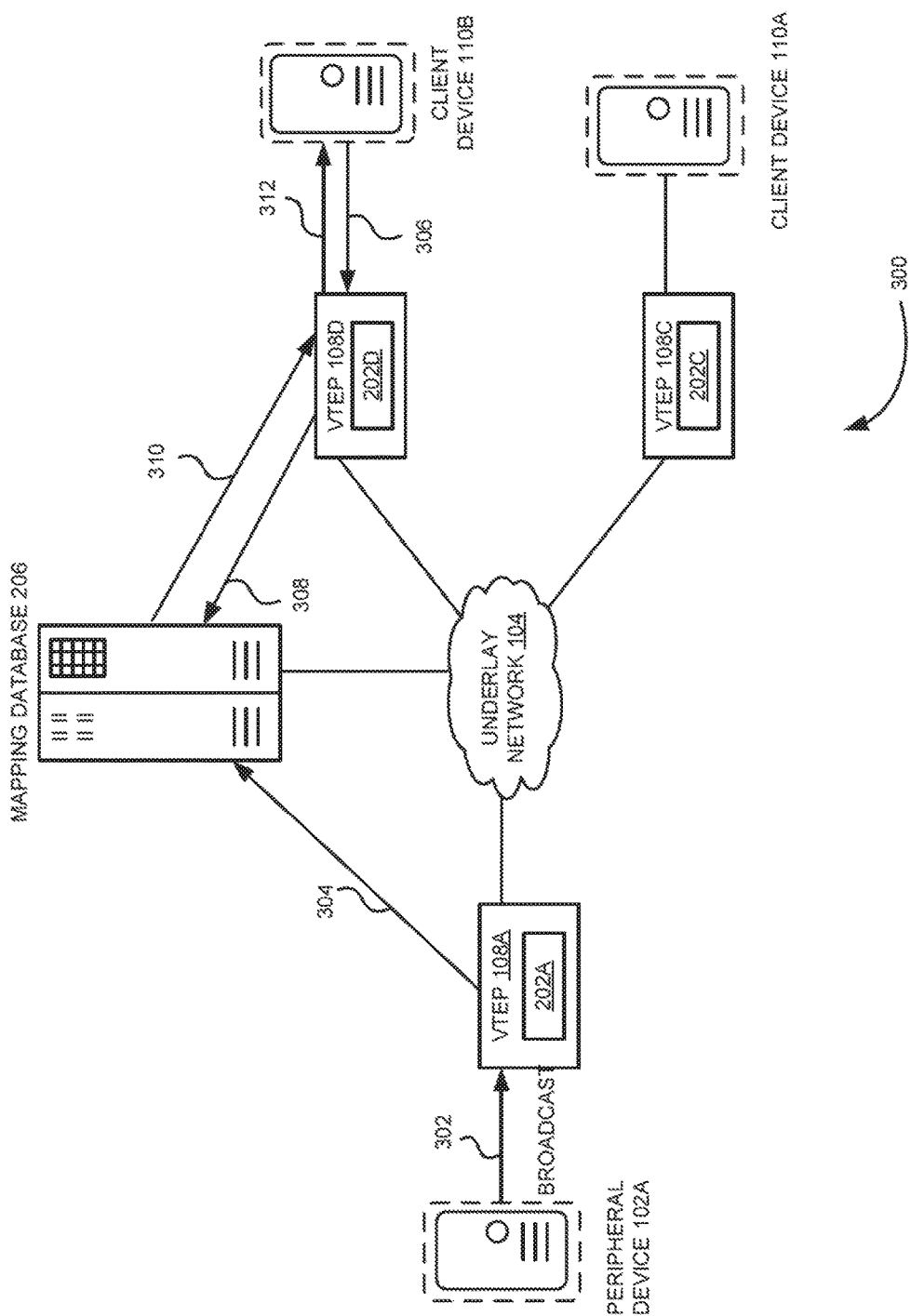
FIG. 3 illustrates a sequence diagram showing an example operation of the example system of FIG. 2.

FIG. 3 illustrates a sequence diagram 300 showing an example operation of the example system of FIG. 2. At step 302, VTEP 108A receives a service advertisement from peripheral device 102A offering the service. At step 304, VTEP 108A registers service advertisement information associated with the service advertisement with mapping database 206. At step 306, VTEP 108D connected to client device 110B receives a request from client device 110B to discover a service. At step 308, VTEP 108D queries mapping database 206 to discover the availability of the service for providing network based discovery of service via a unicast message. At step 310, VTEP 108D receives a response with information on service availability from mapping database 206. As step 312, VTEP 108D proxy responds the response to client device 110B such that client device 110B can select peripheral device 102A offering the service via a unicast message.

Figure 4:
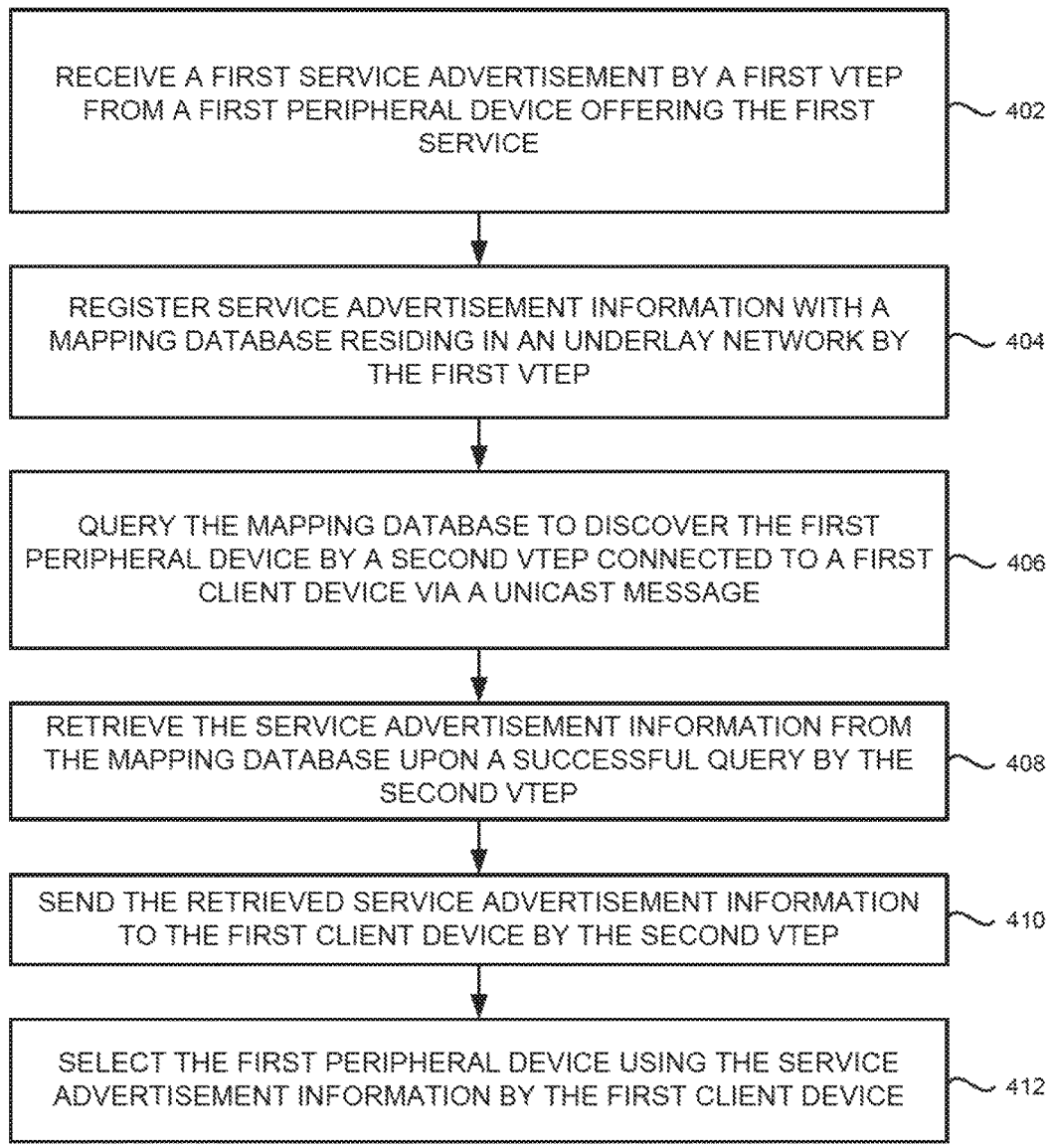
FIG. 4 illustrates a flow chart of an example method for underlay network traffic optimization for service discovery in virtualized network deployments.

FIG. 4 illustrates a flow chart 400 of an example method for underlay network traffic optimization for service discovery in virtualized network deployments. The method 400, which is described below, may be executed on a system such as a system 200 of FIG. 2. However, other systems may also be used. At block 402, a first service advertisement is received by a first VTEP from a first peripheral device offering the first service. The peripheral device is connected to an overlay network. At block 404, service advertisement information associated with the first service advertisement is registered with a mapping database residing in an underlay network by the first VTEP. In one example, the first service advertisement is translated into identifiable service advertisement information by the first VTEP and the identifiable service advertisement information is registered with the mapping database residing in the underlay network by the first VTEP. Example service advertisement information includes, but not limited to, a service type, IP address of service provider, and/or IP address of the first VTEP. The mapping database, for instance, includes a LISP registry, DNS registry and/or a proprietary registry, the proprietary registry uses a proprietary protocol to interface with VTEPs.

At block 406, the mapping database is queried to discover the first peripheral device offering the first service by a second VTEP connected to a first client device via a unicast message upon receiving a request for discovering the first peripheral device from the first client device. The first and second VTEPs transport traffic for the overlay network. The overlay network is a single layer-2 extended IP subnet, and the underlay network is a L3 fabric.

In one example, querying the mapping database to discover the first peripheral device includes receiving a request for discovering the first peripheral device offering the first service from the first client device by the second VTEP, determining whether the first peripheral device offering the first service is available in a cache associated with the second VTEP, and querying the mapping database to discover the first peripheral device offering the first service by the second VTEP when the first peripheral device offering the first service is not available in the cache associated with the second VTEP. In another example, the mapping system is queried for availability of the first peripheral device for providing network based discovery service by the second VTEP connected to the first client device based on locality based policies.

At block 408, the service advertisement information is retrieved from the mapping database upon a successful query by the second VTEP. At block 410, the retrieved service advertisement information is sent to the first client device by the second VTEP. In one example, the retrieved service advertisement information is proxy sent to the first client device by the second VTEP using a proxy and the service advertisement information is added to a cache associated with the second VTEP.

At block 412, the first peripheral device offering the first service is selected using the service advertisement information by the first client device via a unicast message. Upon selecting the first peripheral device, a unicast message is sent to the first peripheral device offering the first service by the first client device. Further, the first peripheral device offering the first service and the first client device are bridged via the first and second VTEPs by the second VTEP using tunnel.

The method and apparatus described through FIGS. 1-4 may ensure that VTEPs can flood MDNS frames out its local interfaces so that intra-VTEP MDNS functioning remains unchanged. The method and apparatus described through FIGS. 1-4 may provide a control plane messaging scheme (e.g., via LISP, DNS) which is of light weight and can scale up to a reasonable number of client devices and services as it is not directly in the data path but just an helper function for aiding service discovery. The method and apparatus described through FIGS. 1-4 can be extended to support an L2 virtual private network (VPN)/MetroEthernet based network deployment where VXLAN tunnels are replaced by WAN links and the underlay is now the WAN. The method and apparatus described through FIGS. 1-4 can be extended to other overlay tunneling schemes like Network Visualization using Generic Routing Encapsulation (NVGRE), Generic Network Virtualization Encapsulation (GENEVE) and Stateless Transport Tunneling (STT) and can run on IPv6. The method and apparatus described through FIGS. 1-4 can work for IPv6 based MDNS and SSDP discoveries.

Figure 5:
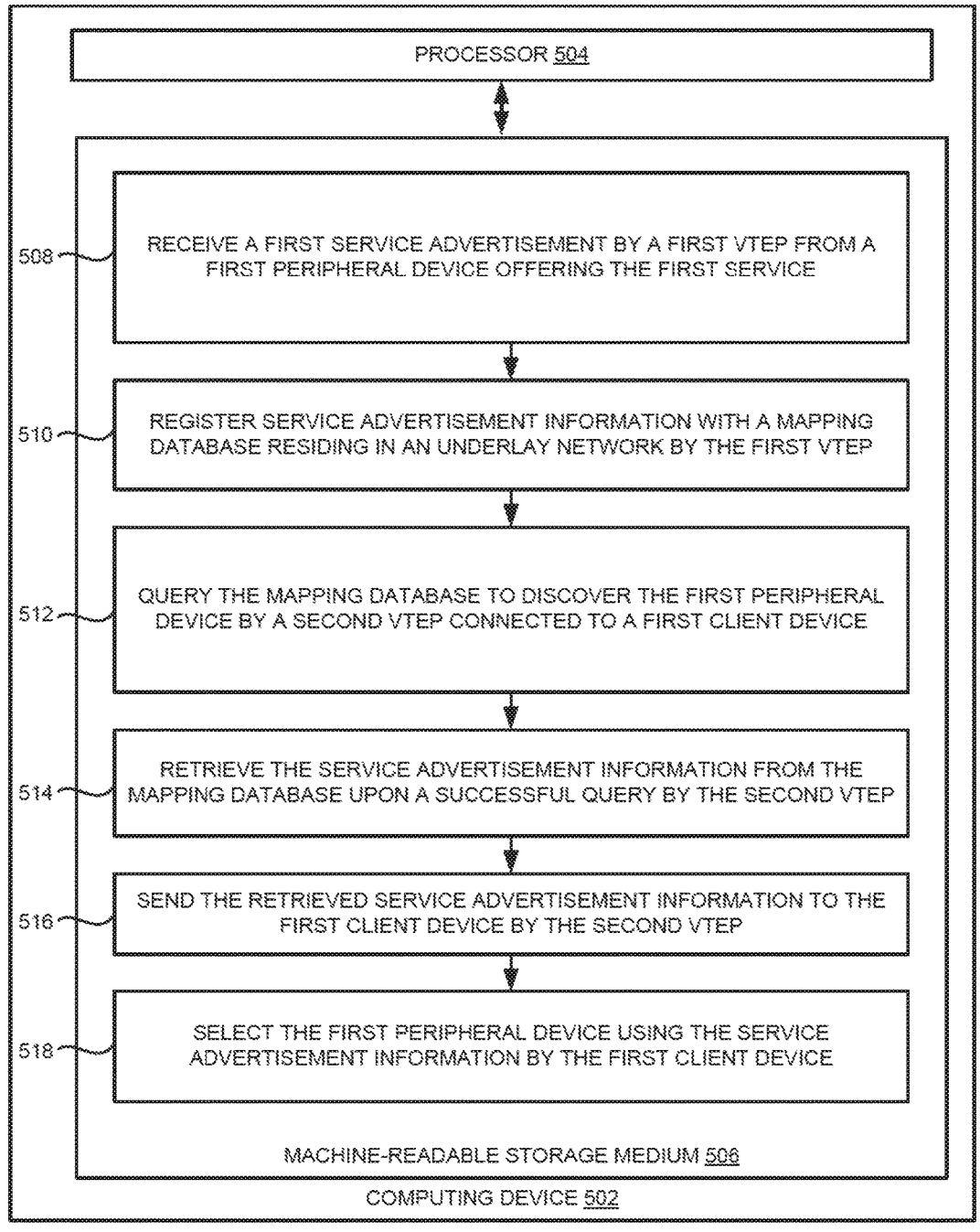
FIG. 5 illustrates a block diagram of an example computing device for underlay network traffic optimization for service discovery in virtualized network deployments.

FIG. 5 illustrates a block diagram 500 of an example computing device 502 for underlay network traffic optimization for service discovery in virtualized network deployments. The computing device 502 includes a processor 504 and a machine-readable storage medium 506 communicatively coupled through a system bus. The processor 504 may be any type of central processing unit (CPU), microprocessor, or processing logic that interprets and executes machine-readable instructions stored in the machine-readable storage medium 506. The machine-readable storage medium 506 may be a random access memory (RAM) or another type of dynamic storage device that may store information and machine-readable instructions that may be executed by the processor 504. For example, the machine-readable storage medium 506 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, the machine-readable storage medium 506 may be a non-transitory machine-readable medium. In an example, the machine-readable storage medium 506 may be remote but accessible to one or more computing devices.

The machine-readable storage medium 506 may store instructions 508 to 518. In an example, instructions 508 to 518 may be executed by one or more processors to provide a mechanism for underlay network traffic optimization for service discovery in vitalized network deployments. Instructions 508 may be executed by one or more processors to receive a first service advertisement by a first VTEP from a first peripheral device offering the first service. Instructions 510 may be executed by one or more processors to register service advertisement information associated with the first service advertisement with a mapping database residing in an underlay network by the first VTEP. Instructions 512 may be executed by one or more processors to query the mapping database to discover the first peripheral device offering the first service by a second VTEP connected to a first client device via a unicast message.

Instructions 514 may be executed by one or more processors to retrieve the service advertisement information from the mapping database upon a successful query by the second VTEP. Instructions 516 may be executed by one or more processors to send the retrieved service advertisement information to the first client device by the second VTEP. Instructions 518 may be executed by one or more processors to select the first peripheral device offering the first service using the service advertisement information by the first client device via a unicast message.

It may be noted that the above-described examples are for the purpose of illustration only. Although the subject matter has been described in conjunction with a specific embodiment thereof, numerous modifications may be possible without materially departing from the teachings and advantages of the subject matter described herein. Other substitutions, modifications and changes may be made without departing from the spirit of the present subject matter. All of the features disclosed in this specification (including any accompanying claims, abstract and drawings), and/or all of the steps of any method or process so disclosed, may be combined in any combination, except combinations where at least some of such features and/or steps are mutually exclusive.

Although the flow diagram of FIG. 4 illustrates specific orders of execution, the order of execution can differ from that which is illustrated. For example, the order of execution of the blocks can be scrambled relative to the order shown. Also, the blocks shown in succession can be executed concurrently or with partial concurrence. All such variations are within the scope of the present subject matter.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:
1. A system, comprising:
    an underlay network comprising:
        a mapping server; and
        a mapping database residing in the mapping server;
    an overlay network virtually connected to the underlay network, wherein the overlay network comprises:

virtual extensible local area network (VXLAN) tunnel endpoints (VTEPs), wherein each VTEP comprises:
a traffic optimization module;
at least one peripheral device; and
at least one client device communicatively connected to the at least one peripheral device via the VTEPs,
wherein a first traffic optimization module residing in a first VTEP receives a first service advertisement from a first peripheral device offering the first service and registers service advertisement information associated with the first service advertisement with the mapping database,
wherein a second traffic optimization module residing in a second VTEP connected to a first client device queries the mapping database to discover the first peripheral device via a unicast message upon receiving a request for discovering the first peripheral device from the first client device, retrieves the service advertisement information from the mapping database upon a successful query, and sends the retrieved service advertisement information to the first client device, and
wherein the first client device selects the first peripheral device offering the first service using the service advertisement information via a unicast message.

2. The system of claim 1, wherein the first client device sends the unicast message to the first peripheral device offering the first service upon selecting the first peripheral device offering the first service, and wherein the second traffic optimization module bridges the first peripheral device offering the first service and the first client device via the first and second VTEPs.

3. The system of claim 1, wherein the first traffic optimization module is to:
translate the first service advertisement into identifiable service advertisement information; and
register the identifiable service advertisement information with the mapping database residing in the underlay network.

4. The system of claim 1, wherein the mapping database comprises one of a list of processing (LISP) registry, domain name system (DNS) registry and a proprietary registry, wherein the proprietary registry uses a proprietary protocol to interface with VTEPs, and wherein the service advertisement information comprises at least one of a service type, Internet protocol (IP) address of service provider, and IP address of the first VTEP.

5. The system of claim 1, wherein the overlay network is a single layer-2 extended IP subnet, and wherein the underlay network is a layer-3 (L3) fabric.

6. The system of claim 1, wherein the second traffic optimization module is to:
receive a request for discovering the first peripheral device offering the first service from the first client device;
determine whether the first peripheral device offering the first service is available in a cache associated with the second VTEP; and
query the mapping database to discover the first peripheral device offering the first service when the first peripheral device offering the first service is not available in the cache associated with the second VTEP.

7. A method, comprising:
receiving a first service advertisement by a first virtual extensible local area network (VXLAN) tunnel endpoint (VTEP) from a first peripheral device offering the first service, wherein the peripheral device is connected to an overlay network;
registering service advertisement information associated with the first service advertisement with a mapping database residing in an underlay network by the first VTEP;
querying the mapping database to discover the first peripheral device offering the first service by a second VTEP connected to a first client device via a unicast message upon receiving a request for discovering the first peripheral device from the first client device;
retrieving the service advertisement information from the mapping database upon a successful query by the second VTEP;
sending the retrieved service advertisement information to the first client device by the second VTEP; and
selecting the first peripheral device offering the first service using the service advertisement information by the first client device via a unicast message.

8. The method of claim 7, further comprising:
sending the unicast message to the first peripheral device offering the first service by the first client device upon selecting the first peripheral device; and
bridging the first peripheral device offering the first service and the first client device via the first and second VTEPs by the second VTEP.

9. The method of claim 7, wherein registering the service advertisement information associated with the first service advertisement with the mapping database residing in the underlay network by the first VTEP, comprises:
translating the first service advertisement by the first VTEP into identifiable service advertisement information; and
registering the identifiable service advertisement information with the mapping database residing in the underlay network by the first VTEP.

10. The method of claim 7, wherein sending the retrieved service advertisement information to the first client device by the second VTEP comprises:
proxy sending the retrieved service advertisement information to the first client device by the second VTEP using a proxy, wherein the service advertisement information is added to a cache associated with the second VTEP.

11. The method of claim 7, wherein the mapping database comprises one of a list of processing (LISP) registry, domain name system (DNS) registry and a proprietary registry, wherein the proprietary registry uses a proprietary protocol to interface with VTEPs, and wherein the service advertisement information comprises at least one of a service type, Internet protocol (IP) address of service provider, and IP address of the first VTEP.

12. The method of claim 7, wherein the first and second VTEPs transport traffic for the overlay network, wherein the overlay network is a single layer-2 extended IP subnet, and wherein the underlay network is a layer-3 (L3) fabric.

13. The method of claim 7, wherein querying the mapping database to discover the first peripheral device offering the first service by the second VTEP connected to the first client device via the unicast message, comprises:
receiving a request for discovering the first peripheral device offering the first service from the first client device by the second VTEP;
determining whether the first peripheral device offering the first service is available in a cache associated with the second VTEP; and querying the mapping database to discover the first peripheral device offering the first service by the second VTEP when the first peripheral device offering the first service is not available in the cache associated with the second VTEP.

14. A non-transitory computer readable storage medium comprising a set of instructions executable by a processor resource to:
   receive a first service advertisement by a first virtual extensible local area network (VXLAN) tunnel endpoint (VTEP) from a first peripheral device offering the first service, wherein the peripheral device is connected to an overlay network;
   register service advertisement information associated with the first service advertisement with a mapping database residing in an underlay network by the first VTEP;
   query the mapping database to discover the first peripheral device offering the first service by a second VTEP connected to a first client device via a unicast message upon receiving a request for discovering the first peripheral device from the first client device;
   retrieve the service advertisement information from the mapping database upon a successful query by the second VTEP;
   send the retrieved service advertisement information to the first client device by the second VTEP; and
   select the first peripheral device offering the first service using the service advertisement information by the first client device via a unicast message.

15. The non-transitory computer readable storage medium of claim 14, comprising instructions to:
   send the unicast message to the first peripheral device offering the first service by the first client device upon selecting the first peripheral device; and
   bridge the first peripheral device offering the first service and the first client device via the first and second VTEPs by the second VTEP.

* * * * *